US007328268B1

(12) United States Patent
Foltak et al.

(10) Patent No.: US 7,328,268 B1
(45) Date of Patent: Feb. 5, 2008

(54) MAINTAINING A COMMON AAA SESSION ID FOR A CALL OVER A NETWORK

(75) Inventors: Richard Foltak, Plano, TX (US); Lio Cheng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 860 days.

(21) Appl. No.: 10/032,628

(22) Filed: Oct. 26, 2001

Related U.S. Application Data

(63) Continuation of application No. 09/965,932, filed on Sep. 28, 2001.

(51) Int. Cl.
*G06F 15/16* (2006.01)

(52) U.S. Cl. ........................................ 709/228; 709/227

(58) Field of Classification Search ........ 709/223-224, 709/227-228; 705/30
See application file for complete search history.

(56) References Cited

U.S. PATENT DOCUMENTS 6,061,650 A * 5/2000 Malkin et al. .............. 704/228
6,070,192 A * 5/2000 Holt et al. .................. 709/227
6,151,628 A * 11/2000 Xu et al. .................... 709/225
6,219,790 B1 * 4/2001 Lloyd et al. ................ 713/201
6,298,383 B1 * 10/2001 Gutman et al. ............. 709/229
6,377,982 B1 * 4/2002 Rai et al. ..................... 709/217
6,405,251 B1 * 6/2002 Bullard et al. .............. 709/224
6,430,619 B1 * 8/2002 Sitaraman et al. .......... 709/225
6,446,200 B1 * 9/2002 Ball et al. ....................... 713/1
6,560,217 B1 * 5/2003 Peirce et al. ................ 370/351
6,614,809 B1 * 9/2003 Verma et al. ............... 370/469
6,625,657 B1 * 9/2003 Bullard ........................ 709/237
6,751,663 B1 * 6/2004 Farrell et al. ............... 709/224
6,836,765 B1 * 12/2004 Sussman ...................... 705/75
2002/0046277 A1 * 4/2002 Barna et al. ................ 709/224
2002/0069278 A1 * 6/2002 Forslow ...................... 709/225
2002/0091636 A1 * 7/2002 Carroll Bullard ............ 705/40

OTHER PUBLICATIONS

Rigney, C. et al. "Request for Comments (RFC) 2865: Remote Authentication Dial in User Service (RADIUS)", published by Network Working Group, Jun. 2000, 76 pages.*
Zorn, G. et al. "Request for Comments (RFC) 2867: RADIUS Accounting Modifications for Tunnel Protocol Support", published by Network Working Group, Jun. 2000, 11 pages.*
Rigney, C. "RADIUS Accounting", published by Network Working Group, Jun. 2000, 28 pages.*
Cisco Systems, Inc., "Advanced Virtual Private Dialup Network Configuration", Cisco Configuration Cookbook, Cisco—Advanced VPDN, http://www.ciscopro.com/warp/public/793/access_dial/advancedvpdn.html, 5 pages, © 1992-1999 Cisco Systems, Inc. (printed on May 3, 2001).

(Continued)

*Primary Examiner*—George C. Neurauter, Jr.
(74) *Attorney, Agent, or Firm*—Campbell Stephenson LLP

(57) ABSTRACT

A method, system, and apparatus are provided for maintaining a common unique session identifier for a call over a network. In at least one embodiment, a unique session identifier is created by appending the IP address of an access server to a local session identifier.

25 Claims, 4 Drawing Sheets

OTHER PUBLICATIONS

Cisco Systems, Inc., "Technology Brief—Layer 2 Tunnel Protocol", Technology Briefs, Cisco—Layer 2 Tunnel Protocol, http://www.cisco.com/warp/public/cc/pd/iosw/tech/12pro_tc.htm, 19 pages, © 1992-2000 Cisco Systems, Inc. (printed on Jul. 12, 2001).

Cisco Systems, Inc., "Which VPN Solution is Right for You?", Tech Notes, http://www.ciscopro.com/warp/public/707/which_vpn.html, 4 pages, © 1992-2001 Cisco Systems, Inc. (printed on May 3, 2001).

Cisco Systems, Inc., "Detailed Scenario for Access VPDN Dial-in Using L2TP", http://www.cisco.com/univercd/cc/td/doc/cisintwk/intsolns/12tp/12tp.htm, 11 pages (printed on May 3, 2001).

Cisco Systems, Inc., "Configuring a Basic Virtual Private Dialup Network (VPDN)", Sample Configurations, http://www.ciscopro.com/warp/public/793/access_dial/vpdn.html, 6 pages, © 1992-2001 Cisco Systems, Inc. (printed on May 3, 2001).

* cited by examiner

MAINTAINING A COMMON AAA SESSION ID FOR A CALL OVER A NETWORK

CROSS-REFERENCE TO RELATED APPLICATIONS

This application relates to application Ser. No. 09/965,932, filed on Sep. 28, 2001, entitled "Maintaining A Common AAA Session ID For A Call Over A Network" and naming Richard Foltak and Lio Cheng as inventors, the application being incorporated herein by reference in its entirety.

BACKGROUND OF THE INVENTION

1. Field of the Invention

The present invention generally relates to data network processing and, more particularly, to maintaining a AAA common session id for a call over a data network that involves multiple networking devices.

2. Description of the Related Art

AAA (Authentication, Authorization, and Accounting) is a general term used for the operation and management of authentication and billing systems used in data networking devices. Standard bodies such as the IETF (The Internet Engineering Task Force) have developed protocols such as Radius, to serve as open AAA client/server models. Other companies, such as Cisco Systems, Inc., have also developed proprietary AAA protocols such as TACACS+ to address their own niche requirements. One common aspect of all AAA protocols is that each must provide a means to identify a given session with a unique identifier. However, current implementations limit this identifier to a single data networking device. The Radius protocol supports this identifier via attribute 44, the Accounting-Session-Id. The TACACS+protocol supports this identifier via the task_id attribute. The identifier will be referred to generically herein as the "session identifier" or "session id."

SUMMARY OF THE INVENTION

A method, system, and apparatus are provided for maintaining a common unique session identifier for a call over a network. The method comprises creating a unique session identifier and providing the unique session identifier to a software module that provides for performing authentication. In at least one embodiment, creating a unique session identifier further comprises appending the IP address of the access server to a local session identifier.

The system comprises one or more network access servers, each of which is associated with a corresponding unique IP address. Each of the network access servers is configured to generate a corresponding local session identifier and a unique session identifier. In at least one embodiment, each of the one or more network access servers is further configured to generate the corresponding unique session identifier by appending the corresponding unique IP address with the corresponding local session identifier.

The apparatus comprises means for creating a unique session identifier and means for providing the unique session identifier to a software module that provides for performing authentication. In at least one embodiment, means for creating a unique session id further comprises means for appending the IP address of the access server to a local session identifier.

The foregoing is a summary and thus contains, by necessity, simplifications, generalizations, and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 4, including

The use of the same reference symbols in different drawings indicates similar or identical items.

DETAILED DESCRIPTION

The following sets forth a detailed description of a mode for carrying out the invention. The description is intended to be illustrative of the invention and should not be taken to be limiting.

Figure 1A:
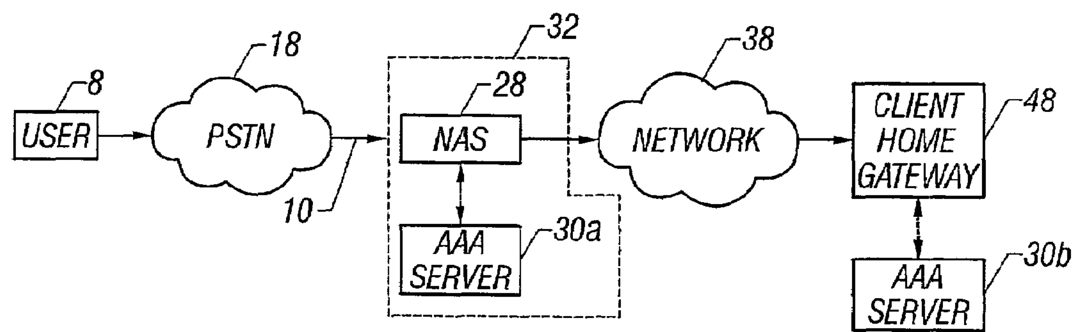
FIG. 1A is a block diagram illustrating a prior art communication network topology.
Figure 1B:
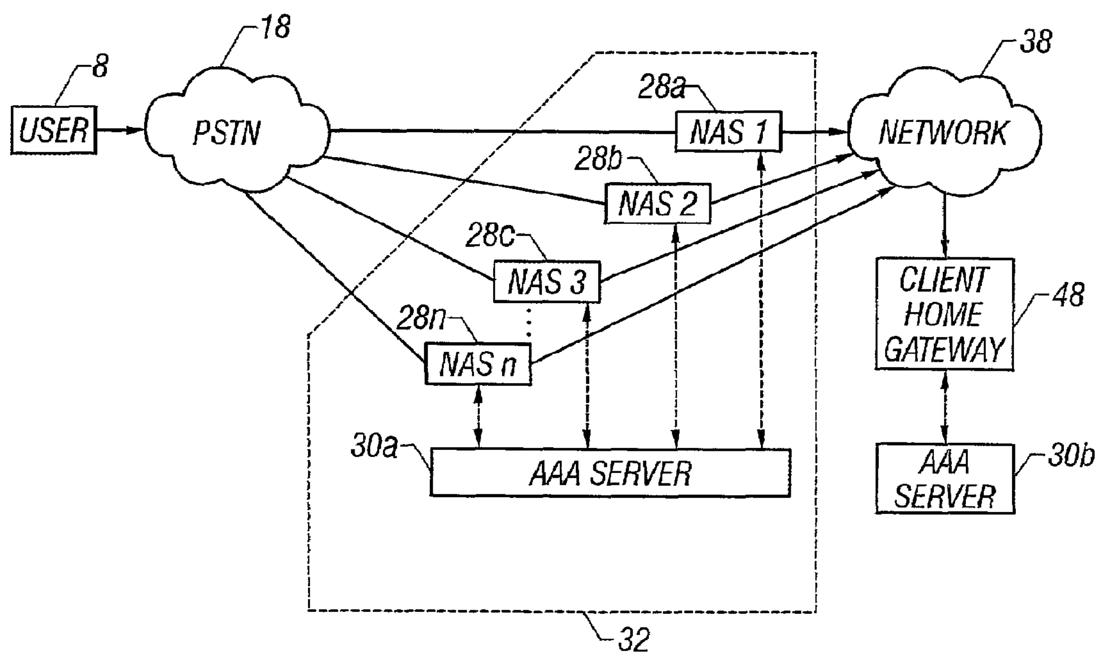
FIG. 1B is a block diagram illustrating a prior art communication network topology that is configured to include multiple network access devices.
Figure 2:
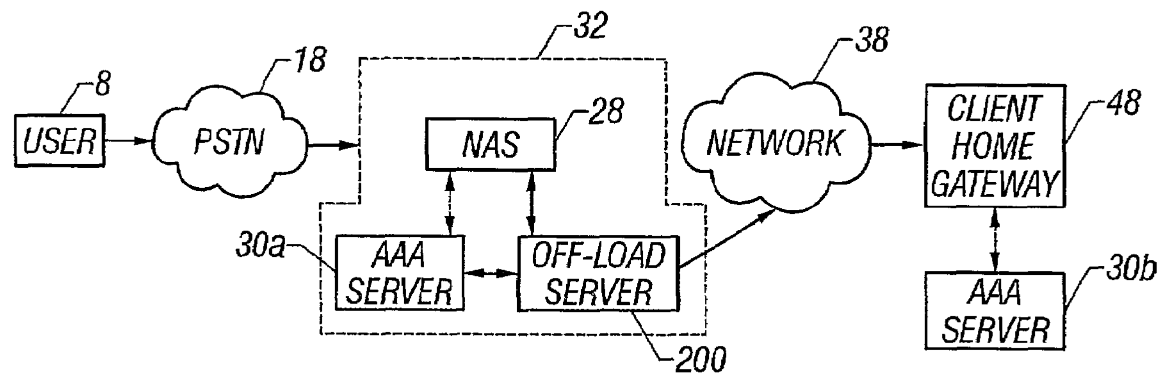
FIG. 2 is a block diagram illustrating a communication network topology that is configured to include an off-load server at the POP.
Figure 3:
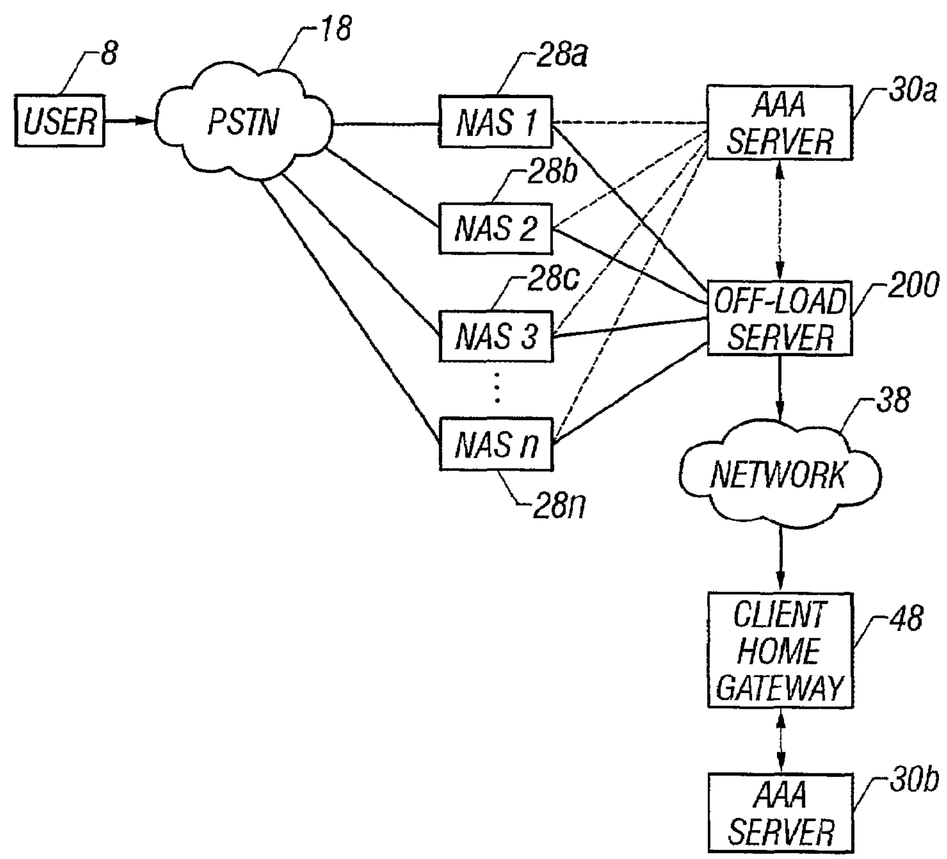
FIG. 3 is a block diagram illustrating a communication network topology that includes multiple network access devices and an off-load server at the POP.

FIGS. 1A and 1B are block diagrams illustrating prior art network topologies. FIGS. 2 and 3 are block diagrams illustrating network topologies in which the present invention may be practiced. The communication networks are shown to include a Public Switched Telephone Network ("PSTN") 18. The PSTN 18 includes devices such as "switches" that form a part of the public telephone network. The PSTN 18 is responsible for multiplexing multiple communications lines into a single digital trunk which, using time-slicing, can compress multiple calls into a single T1 or E1 trunk. Certain countries, such as the United States, utilize T1 trunk lines. In contrast, other countries, such as those in Europe, utilize E1 trunk lines. These T1 or E1 trunk lines are then managed within the PSTN via carrier switches. For the purposes of this discussion, the PSTN 18 includes all devices within the network that are managed by a single carrier switch.

The networks illustrated in FIGS. 1A through 3, including 1B, allow a private network dial-in service (such as AOL, MSN, Juno, etc.), associated with the client server 48, to span across to remote access servers 28, where the remote access servers 28 are managed by wholesale providers. Wholesale data network dial-in services are sometimes referred to as Internet Service Providers ("private network providers"). Remote access servers are often referred to in the art as Network Access Servers ("NAS"). Each of the client servers 48, remote access servers 28, and AAA servers

30 may be, for example, a computer system of any appropriate design, in general, including a mainframe, a mini-computer, or a personal computer system. Such a computer system typically includes a system unit having a system processor and associated volatile and non-volatile memory. They may also include one or more display monitors and keyboards, one or more disk drives, one or more fixed storage devices, and/or one or more printers. These computer systems are typically information handling systems which are designed to provide computing power to one or more users, either locally or remotely (i.e., user 8). Such a computer system may also include one or a plurality of I/O devices (i.e., peripheral devices) which are coupled to the system processor and which perform specialized functions. Examples of I/O devices include modems, sound and video devices, and specialized communication devices. Mass storage devices such as hard disks, CD-ROM drives, and magneto-optical drives may also be provided, either as an integrated or peripheral device. Applications resident within computer systems such as NAS devices 28, AAA servers 30, and home gateway servers 48 are generally stored on and accessed via a computer readable medium, such as a hard disk drive, an optical drive (e.g., CD-ROM drive), floppy disk unit, or other storage medium. Additionally, applications may be in the form of electronic signals modulated in accordance with the application and data communication technology when accessed via network modem or interface. Examples of servers that are used as NAS devices are the AS5800, AS5300, and AS5400 models of products developed by Cisco Systems, Inc. of San Jose, Calif.

It will be noted that the variable identifier "N" is used in FIGS. 1B and 3 to more simply designate the final element (e.g., NAS devices 28*a*-28*n*) of a series of related or similar elements (e.g., NAS devices). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Private network dial-in services typically do not maintain their own NAS(s) 28, as this would require installing and maintaining these devices throughout the service's geographic area. That is, a private network dial-in service would have to install NAS equipment at every PSTN area code for which it offers service. Many private network dial-in services wish to avoid the large expense associated with such installation and maintenance. Accordingly, other companies (such as UUNet, Qwest, Genuity, etc.), act as wholesalers for such private network providers. They maintain POPs (Point of Presence) throughout the geographic areas they service, leasing capacity to other private network companies.

Typically, a user 8 dials into a local NAS 28 via the PSTN 18. The user 8 may be the operator of a personal computer (PC) or other type of communication equipment. The user's 8 communication equipment (such as an analog modem or ISDN modem) must first connect with the NAS 28 and negotiate a communication standard with the hardware found on the NAS 28. Once the negotiation is accomplished, the user's 8 equipment must start a service with the network 38, so that the user 8 may be able to access content in the fashion offered by the private network service provider. (The private network service provider often provides its own unique content to the end user 8 as a service differentiator). For example, the user 8 equipment typically establishes a Point-to-Point ("PPP") session with a client server 48, also known as a "home gateway server," using a VPDN (Virtual Private Data Network) tunneling protocol such as L2F or L2TP. A PPP session is typically initiated when a user 8 wishes to establish a connection with a networking device such as the client server 48. The NAS 28, in conjunction with the AAA (Authentication, Authorization, and Accounting) server 30*a*, determines whether the PPP session should be forwarded to the client server 48, which acts as the home gateway router for the private network service provider. On its home gateway 48, the private network service provider authenticates the user 8 via its own AAA server 30*b*. The client server 48 then starts the PPP negotiation. After the PPP setup is complete, all frames are sent via the NAS 28 between the user 8 and the home gateway 48.

In the network illustrated in FIGS. 1A and 1B, the PSTN 18 typically contains line cards (not shown), which are essentially carrier switches used by the telephone company for switching various incoming calls to different destinations. Based on the number that the user 8 dialed the PSTN 18 switches the call to the desired destination. The PSTN 18 switches the incoming call to a local NAS 28, when the appropriate number is dialed. As described above, the NAS 28 is typically associated with a remote access wholesaler provider because most private network service providers typically do not own NAS 28 hardware in the user's 8 locale. Instead, the private network service provider has a home gateway server 48 at some location remote from the NAS 28. As stated above, this is because most private network service providers do not provide their own NAS hardware but, rather, lease access server service from a wholesale provider such as Genuity, GTE, UUnet, Southwestern Bell, or another provider of wholesale access server service.

The NAS 28 converts data traffic from the PSTN protocol (i.e., a timeslot protocol) to a packetized data protocol (such as PPP) that is used within data networks such as the network 38. A NAS 28 is essentially a specialized type of router having a T1/E1 controller card. The T1/E1 controller card includes hardware for multiplexing and de-multiplexing Time Division Multiplexed ("TDM") signals coupled onto T1 or E1 lines. That is, the TDM hardware separates the calls that are coupled onto a PSTN trunk based upon assigned time slots, into individual calls. A router is a device that can select a path that information traveling through a packet switching network environment should take.

When a NAS 28 receives a call from the PSTN 18, most often, some level of call authentication must take place. The user 8 that has initiated the call typically provides authentication information, such as when user 8 provides a username (such as jane.doe@msn.com) and a password when attempting to log in to the user's 8 service provider. In at least one embodiment, the password is encrypted. Authentication of such information is part of a concept known as AAA (Authentication, Authorization, and Accounting). The NAS 28 performs the client side AAA processing. In most embodiments of such networks, such as the embodiments illustrated in FIGS. 1A and 1B, a server 30*a* separate from the NAS 28 performs AAA server-side services (accepts or rejects client side requests) based on the server's database account records. In some prior art embodiments, server-side AAA services are performed on the NAS 28 itself; however, such embodiment is not scalable and is often limited.

AAA client/server services can be performed according to any of several protocols. One such protocol is the Remote Authentication Dial-in User Service (RADIUS) protocol, which is an access server authentication, authorization, and accounting protocol developed by Livingston Enterprises, Inc., which has been acquired by Lucent Technologies, Inc., that has been standardized by the IETF. Another such protocol is the Terminal Access Controller Access Control System ("TACACS+") protocol, which is an access server authentication, authorization, and accounting protocol developed by Cisco Systems, Inc. of San Jose, Calif.

When the NAS 28 receives the call, it opens a session for the call. A session id is then assigned to the call. For instance, if AAA services are performed according to the RADIUS protocol, the session id corresponds to Radius Attribute 44. As another example, if AAA services are performed according to the TACACS+ protocol, the session id corresponds to the task_id attribute. The NAS 28 then builds an AAA access request for the call. As stated above, this authentication processing can be either carried out by one or more software modules that run on the NAS 28, or can be off-loaded to a separate AAA server 30*a* that runs such processing and forwards the session id access response back to the NAS 28. In at least one embodiment of a separate AAA server 30, the AAA server 30 includes a hardware server along with a daemon process that runs on the server hardware, the daemon software modules implementing an AAA protocol such as the RADIUS protocol. The NAS 28 and AAA server 30*a* are considered part of the wholesale provider's Point of Presence (POP) 32. The POP 32 is the physical location found within a given PSTN area code, typically the same room/building, at which a wholesaler manages their networking infrastructure for a given geographic presence.

In order to initiate authentication, the NAS 28, acting as an AAA client, performs processing that creates an Access Request. The Access Request contains attributes such as the username and password. The AAA server 30*a* receives the access request, authenticates the user, and returns an Access-Reject response or an Access-Accept response to the NAS 28. The AAA server 30*a* may also return user configuration attributes to the NAS 28. For instance, the AAA server 30*a* usually returns either an Access-Accept or Access-Reject response to the NAS 28. Along with an Access-Accept response, the AAA server 30*a* forwards to the NAS 28 a user profile with configuration information regarding how the call is to be handled.

An AAA server 30*a* can act as a proxy to other AAA servers 30*b*. For instance, FIGS. 1A and 1B illustrate that the AAA server 30*a* in the wholesaler's POP 32 forwards information that is ultimately transmitted to the client server's AAA server 30*b*. The AAA server 30*a* in the wholesaler's POP 32 allows the wholesaler to keep accounting information to track the resources (i.e., time, packets, bytes, etc.) used during a call. The AAA server 30*a* can also perform a utilization tracking function known as "port counting."

When the POP AAA server 30*a* performs port counting, it keeps track of the number of users, at a given time, that have placed calls to a particular phone number. The number that a caller has dialed is identified by a number provided by a Dialed Number Identification Service ("DNIS number"). Port counting is an often-used AAA server 30*a* feature that requires the NAS 28 to provide 2 levels of authentication referred to herein as "pre-authentication." During pre-authentication, the DNIS number is authenticated during the call setup phase of the call. This action involves sending the DNIS number from the NAS 28 to the AAA server 30*a* as the username, along with a pre-configured password, and any other attributes typically found in an access request. For pre-authentication, the NAS 28 also provides the AAA server 30*a* with the Session Id attribute to be used to track this call. During the call setup phase of the call, the NAS 28, based on information from the AAA server 30*a*, determines whether the maximum number of calls are already logged into the DNIS number associated with a particular private network service provider. The AAA server 30*a* may reject the call if the AAA server 30*a* determines the private network service provider has exceeded its lease agreement on the number of simultaneous users which can be logged on to the private network service at a given POP location. If the attempted call would be in excess of the maximum number of allowed calls, the NAS 28 notifies the PSTN that the call cannot be connected. Rejection of call results in the end user 8 receiving a busy signal from the PSTN. In contrast, if the call is allowed during the call setup phase, the AAA server 30*a* tracks the active call based on the unique session id that was provided to the AAA server 30*a* from the given NAS 28. In such case, the second level of authentication is performed.

The second level of authentication involves the authentication of the username and password, described above, to determine whether the user 8 is authorized to log on to the private network service whose DNIS was dialed. During this level of authentication, the session id previously provided to the NAS is used. The AAA server 30*a* searches a database for the user name provided in the Access-Request (i.e., the dialed DNIS number for pre-authentication and the real username for user authentication). The AAA server 30*a* may also act as a proxy server, and forward the authentication request to AAA server 30*b*. If the user name does not appear in the database or if the password does not match, then an Access-Reject response is generated. If the user 8 name appears in the database, an Access-Accept response is generated. The Access-Accept response generated by the AAA server 30*a* (or AAA server 30*b*, if configured as a proxy server) and forwarded to the NAS 28 includes a list of attribute-value pairs that describe the parameters that are to be used in the session that allows the user to exchange data over the Internet via the client server 48. This may include attributes such as the session's IP address to be used during the duration of the call, or information such as the location (address) of client server 48 with which the session must interface.

The AAA server 30*a* also performs accounting processing to accurately capture session information for billing and tracking purposes. Furthermore, AAA server 30*a* may also act as a proxy to AAA server 30*b*, whereby accounting records are first sent to AAA server 30*a* from NAS 28, processed on AAA server 30*a*, and then forwarded to AAA server 30*b*. This is used to ensure that all billing records and wholesale agreements are tracked between the wholesaler and the private network dial-in service.

The accounting processing performed by the AAA server 30*a* further includes a function critical for port counting. That is, a feature of accounting processing is the request for a STOP record when a session call has terminated. The STOP record is the only record provided to the AAA server 30*a* indicate that a call has ended for a given session. The STOP record allows the AAA server 30*a* to determine when a session has ended. Therefore, by keeping track of the beginning (pre-authentication Access-Request) and end (Accounting-Request of STOP record) of each session, and by keeping track of the DNIS associated with each session, the number of sessions attributed to a particular DNIS (thus, private network dial-in service) can be determined at any given point in time in real time. This port-counting information is important when the service provider's contract with the wholesaler is based upon a specific capacity (i.e., maximum number of calls that must be supported at one time) rather than upon some other basis, such as a per-call basis.

For the AAA server 30*a* to accurately port count and manage sessions, it must correlate all Access-Requests and Accounting-Requests generated from the same call. To do this, the same session id number that was assigned for the first AAA server request must be maintained throughout the life of the call. As described herein, embodiments of the invention allow the same session id number to be used to determine whether the user 8 is authorized to connect to the desired client server 48, and also to determine when that call has begun and when it has ended.

In at least one embodiment, once the AAA server 30*a* has authenticated a call by determining that the user 8 is authorized to connect with the client server 48 whose DNIS number the user 8 dialed, and sent the Access-Accept response to the NAS 28, the NAS 28 determines that it is to forward information, in PPP format, to the client server 48, which acts as a gateway for the private network provider. In order to forward the information, the NAS 28 establishes a Virtual Private Network (VPN) "tunnel" over which PPP packets are sent to the private network service provider's gateway server (i.e., the "client server") 48. The VPN "tunnel" may be established according to one of various software protocols developed for this purpose. Two of these tunnel protocols used to forward PPP data to the home gateway 48 are referred to as Layer 2 Forwarding (L2F) and Layer 2 Tunnel (L2TP). The L2F and L2TP protocols are herein referred to collectively as "L2x."

The client server 48 performs its own authentication of information received over the L2x tunnel using its own AAA server 30*b*. Once this authentication occurs, the user 8 is enabled to send and receive data over the network 38 via a PPP session with the private network provider's client server 48.

FIG. 1B is a block diagram illustrating a prior art communications network topology that includes multiple network access servers 28*a*-28*n* at the POP 32. Each NAS 28 assigns a session id to a call in the order that the call is received. That is, the first call is assigned a session id of "01," the second is assigned a session id of "02," and so forth. In the network illustrated in FIG. 1B, the result is that NAS 28*a* can have a call to which it has assigned a session id value of "01," as can each of the other NAS devices 28*b*-28*n*. Accordingly, it is possible for the AAA server 30*a* to receive n session id values, where each of the n session id values corresponds to a different NAS 28 but is the same number. The AAA server 30*a* can easily handle this condition because the AAA server 30*a* associates each session id value with the corresponding NAS 28 based upon a unique NAS address for each NAS. Because each of these duplicative session id's is coming from a different NAS address, the AAA Server 30*a* can distinguish between the NAS's 28*a*-28*n* when managing the sessions involved.

FIG. 2 is a block diagram illustrating a communications network topology that includes an off-load server 200. A recent architectural evolution has produced the result that wholesale providers are re-designing their hardware configuration such that the PPP session is not administered by the NAS 28. Instead, the PPP protocol software resides on the off-load server 200. The off-load server 200 provides PPP service for the NAS device 28. One of skill in the art will recognize that the PPP protocol is only one of several options for establishing a connection with a network such as the Internet. Other protocols include SLIP (Serial Line Internet Protocol) and variations of PPP including MP (Multipoint Point-to-Point Protocol) and PPPoE (Point-to-Point Protocol over Ethernet). As such, the term "off-load" server will be understood to be any device that is capable of establishing a network connection using PPP or any other known protocol.

The migration of the PPP software from the NAS 28 to the off-load server 200 has ramifications in the authentication and port-counting processes discussed above. In particular, the topology illustrated in FIG. 2 results in a single AAA server 30*a* providing AAA server-side services for both the off-load server 200 and the NAS device 28. When an off-load server 200 is included in the topology, port counting becomes unworkable because the off-load server 200 typically assigns its own new session id to the call when it begins setup processing for the call.

In the FIG. 2 topology, as in the topologies discussed above, the NAS 28 assigns a session id during the pre-authentication processing (i.e., building an Access Request for the DNIS user name) performed when the NAS 28 receives a call setup from the PSTN 18 network. Each NAS 28 assigns a session id to a call in the order that the call is received. The NAS 28 thus performs pre-authorization, but does not perform the PPP service.

Instead, the PPP service is performed by the off-load server 200. Ordinarily, the off-load server 200 assigns a new session id when it begins PPP processing because the client AAA software found on the off-load server 200 has not assigned a session id to the call yet. This multiple assignment occurs because there is no mechanism in the current L2x protocols designed to communicate to the off-load server 200 the session id used by the NAS 28 involved in the call setup during pre-authentication. Nonetheless, it is desirable for the off-load server 200 to maintain the same session id for a session that was assigned to the call by the NAS 28 during pre-authentication processing.

The inventors have determine that it is thus necessary for the off-load server 200 to receive an indication of the session id assigned by the NAS 28. Such an indication is not ordinarily provided to the off-load server 200 from the NAS as a required parameter in the L2x protocols. In order to provide the session id as part of the VPN parameters, the inventors have taken advantage of a feature of the L2x protocols that provide for a string of non-required parameters. The list of mandatory and optional parameters is provided by the NAS 28 to the off-load server 200 during the L2x negotiation. The off-load server 200 inspects the NAS 28 L2x tunnel session setup request for a session_id parameter in the string of non-required parameters. If the off-load server 200 encounters, as a result of this inspection, a string corresponding to the session_id parameter, the off-load server 200 uses the value within that string as the session id, instead of assigning a new value for the session id.

FIG. 3 is a block diagram illustrating a communications network topology that includes an off-load server 200 and multiple NAS devices 28*a*-28*n*. The off-load server 200 provides PPP service for a plurality of NAS devices 28*a* through 28*n*. Collectively, the plurality of NAS devices 28*a* through 28*n*, along with the off-load server 200, are referred to herein as an "access path" device.

In this topology, as in the topologies discussed above, each NAS 28*a*-28*n* assigns a unique session id during the pre-authentication processing (i.e., building an Access Request for the DNIS user name) performed when the NAS 28 receives a call setup from the PSTN 18 network. Again, it is desirable for the AAA server 30*a* to use this same session id when it performs accounting functions, such as port counting, related to the call. As discussed above, in at least one embodiment of the present invention, the session id assigned by the NAS 28 is forwarded to the off-load server 200 in a non-required parameter list. However, this solution creates an additional hurdle in a topology wherein the AAA server 30*a* is responsible for providing server-side services for multiple NAS devices 28*a*-28*n*.

The off-load server 200 is one device, with a single address. Thus, the AAA Server 30*a*, when it receives a session id from the off-load server 200 (which the off-load server 200, in turn, has previously received from one of the NAS devices 28*a*-28*n*), has no way of knowing, under current AAA protocols, which NAS device 28 the session id is associated with. This renders it difficult for the AAA server 30*a* to maintain the same session id for a call that was assigned by one of the NAS devices 28*a*-28*n* during pre-authentication.

To address this challenge, the inventors have determined an efficient manner of indicating to the AAA server 30*a* which of several identical session id's is to be attributed to a specific call. Each NAS 28 is associated with a unique identifier, such as a unique IP address. This unique identifier is appended to the session id so as to create a unique appended session id corresponding to a particular call on a particular NAS 28. This unique appended session id is provided to the AAA server 30*a* during the pre-authentication stage of a call setup. Under this approach, no two NAS devices 28*a*-28*n* will ever send the same unique appended session id to the AAA server 30*a* or to the off-load server 200.

Figure 4A:
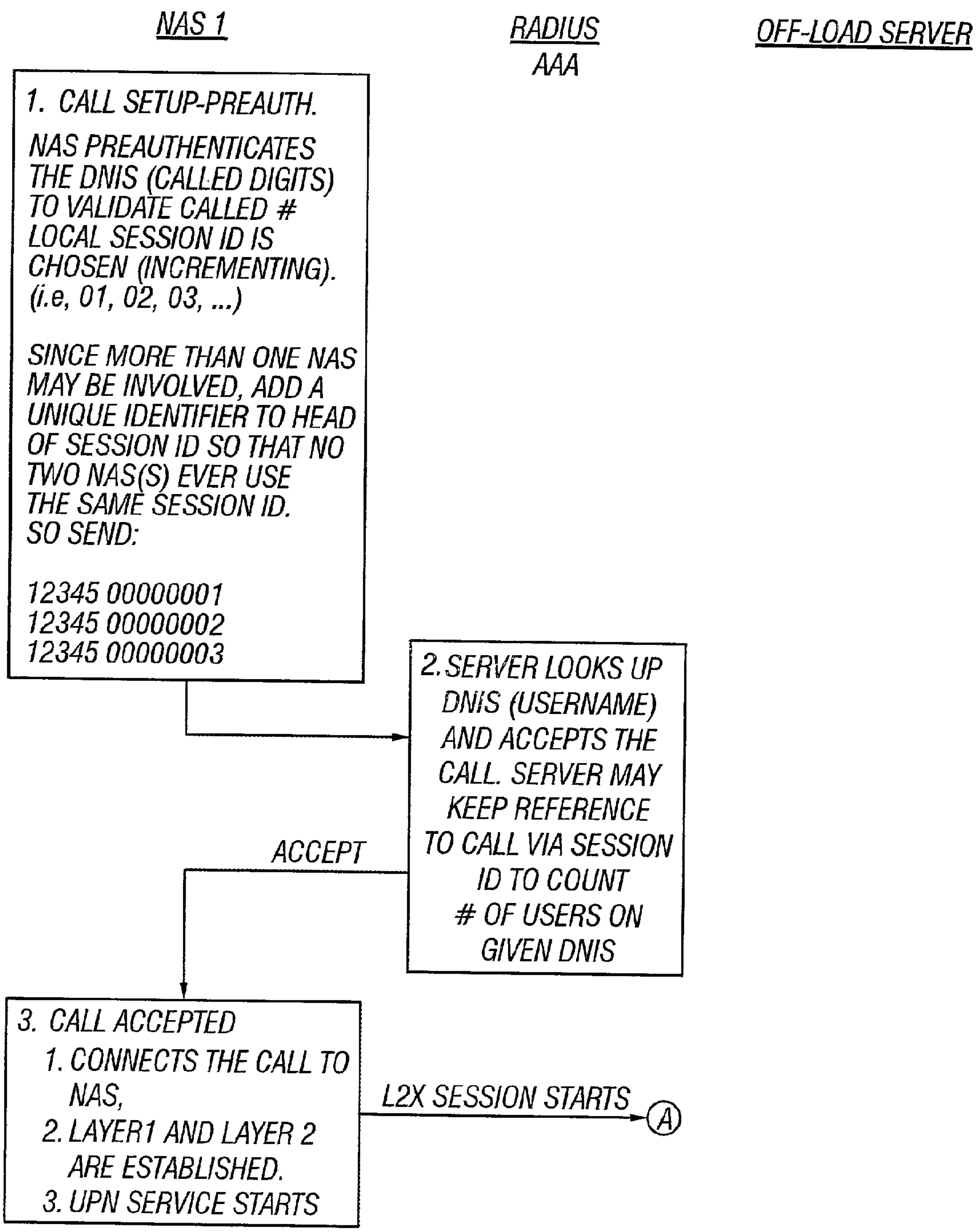
FIG. 4A and FIG. 4B, is a functional diagram illustrating a method of maintaining a common AAA session identifier for a call.
Figure 4B:
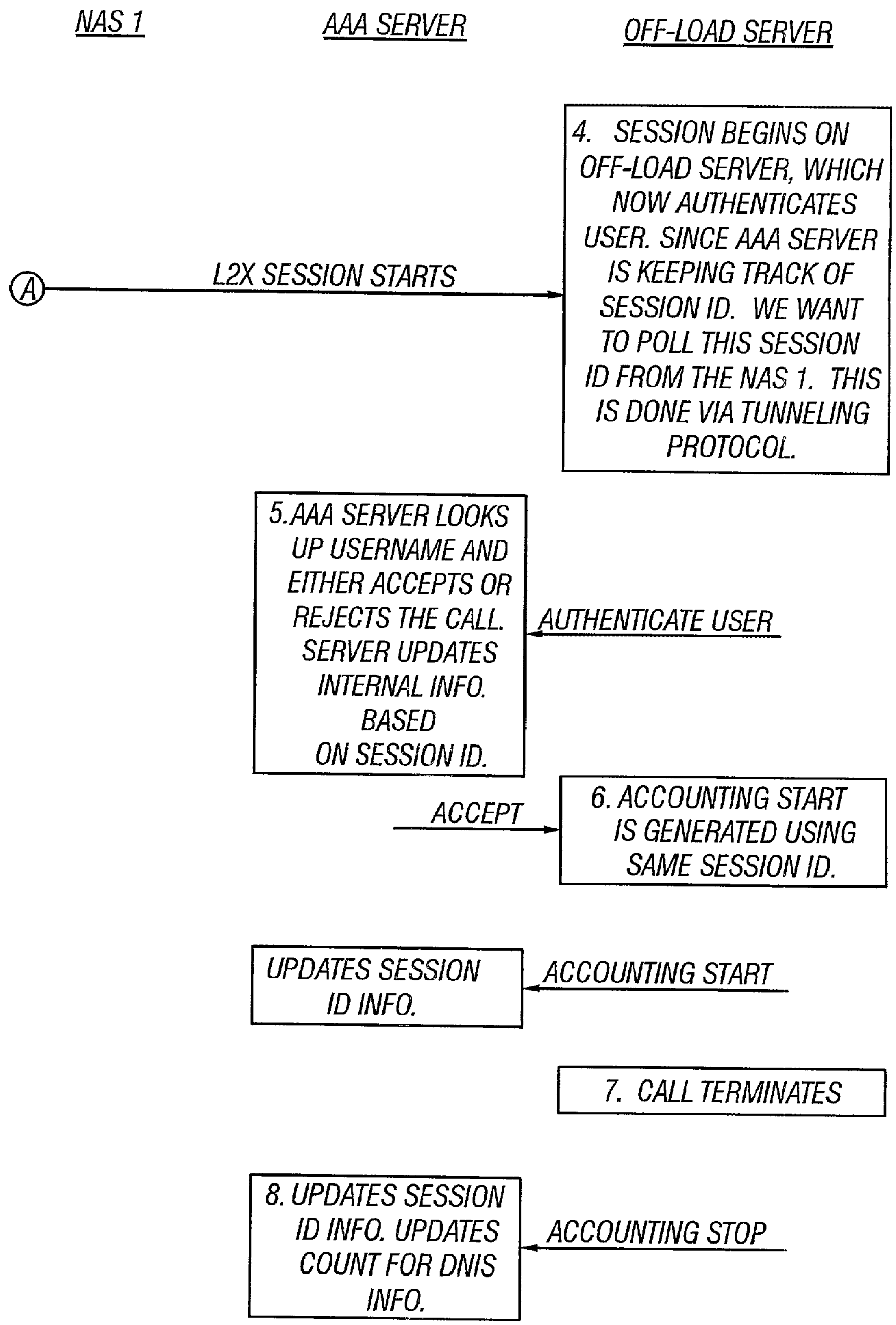

FIG. 4, including FIG. 4A and FIG. 4B, is a functional diagram illustrating a method of maintaining a common and unique session identifier for a call. FIGS. 2 AND 3 are referred to for purposes of discussing the method. In at least one embodiment the operations illustrated in FIG. 4 are implemented in one or more software modules. The operations referred to herein may be modules or portions of modules (e.g., software, firmware, or hardware modules). For example, although the described embodiment includes software modules, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in the example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the operations of the functional diagram may be executed by a module (e.g., a software module) or a portion of a module or a computer system user using, for example, a computer system such as the NAS devices 28, AAA server 30, or client server 48 previously mentioned, or a similar network element. Thus, the method described herein, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

In operation 1, the NAS 28 performs call setup and pre-authorization processing. As part of this processing, the NAS 28 generates an Access Request that includes the dialed DNIS number in the username field of the record. The NAS 28 also assigns a session id to the call. In order to facilitate maintenance of a common id between the NAS 28 and the AAA server 30*a*, the NAS 28 appends the IP address to the session id to its own IP address to generate a unique appended session id. The unique appended session id is then included in the Access Request.

In operation 2, the Access Request, containing the appended session id, is forwarded from the NAS 28 to the AAA server 30*a*. The AAA server 30*a* performs authentication on the call by looking up the username that it has received from the NAS 28 in the Access Request. The AAA server 30*a* checks the username (i.e., dialed DNIS number) against a database stored on the AAA server 30*a*. If the dialed DNIS number is found, the NAS 28 generates an Access Accept response. As discussed above, for accounting functions, such as port counting, the AAA server 30*a* may keep track of the call by reference to the unique appended session id.

Operation 3 of FIG. 4 is triggered when the NAS 28 receives an Access-Accept response from the AAA server 30*a*. The NAS 28 connects the call by coupling the T1 timeslot for the call with a free modem within the NAS 28. The modem (or similar device) then performs the hardware negotiation with the client modem (or similar device) of the user 8 to establish how the two devices will communicate. In this manner, layers 1 and 2 (hardware protocol) of the data communication link between the two devices are established. An L2x session is then initiated, in order to establish a VPN tunnel between the NAS 28 and the off-load server 200.

In operation 4, the L2x session begins on the off-load server 200. The off-load server 200 builds another Access Request that will go to the AAA server 30*a*, this time to authenticate the user 8 that is attempting to establish the PPP session. Because the AAA server 30*a* is keeping track of the session via the appended unique session id that it received from the NAS 28 in operation 3, the off-load server 200 must also make itself aware of the session id in order to communicate with the AAA server 30*a* using this same identifier. In order to do so, the off-load server 200 locates the session-id string from the L2x tunnel session setup request which the NAS 28 initiated. This is done via the L2x tunneling protocol.

In operation 5, the off-load server 200 provides the AAA server 30*a* with the second Access Request. In this list, the username field holds the value of an identifier that is associated with the user 8. For instance, if the user 8 is associated with an Internet identifier such as jane.doe@msn.com, then “jane.doe” is forwarded in the username field. The AAA server 30*a* determines whether the user is authorized to establish a connection with the private network service provider’s gateway server 48. The AAA server actually may only act as a proxy for the authentication request and actually forward this Access Request to the AAA server 30*b*. Regardless, the AAA server 30*a* sends an Access-Accept response, if accepted, and forwards the response to the off-load server 200.

In operation 6, the AAA server 30*a* forwards an accept response to the off-load server 200 if the username authentication is successful. The off-load server 200 receives the response and, in turn, generates an Accounting START record that is associated with the session id that the off-load server 200 received in the L2x setup request that was performed in operation 4. The START record is forwarded to AAA server 30*a*. The AAA server 30*a* may update its accounting information concerning the session id accordingly. For instance, the AAA server 30*a* updates the state of the calls it is counting for the private network service provider.

In operation 7, the PPP session is terminated. Upon termination, the off-load server 200 generates an Accounting Request STOP record associated with the session id and forwards the stop record to the AAA server 30*a*.

In operation 8, the AAA server 30*a* receives the stop record and updates accounting information for that session id accordingly. For instance, the port count for the private network provider can be decremented now that a call to the private network service provider’s DNIS number has been terminated.

The software modules used to implement the operations of FIG. 4 may be received, for example, from computer readable media. The computer readable media may be permanently, removably, or remotely coupled to the computer system. The computer readable media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM, or application specific integrated circuits volatile storage media including registers, buffers or caches, main memory, RAM, and the like, and data transmission media including computer network, point-to-point telecommunication, and carrier wave transmission media. In a UNIX-based embodiment, the software modules may be embodied in a file, which may be a device, a terminal, a local or remote file, a socket, a network connection, a signal, or other expedient of communication or state change. Other new and various types of computer-readable media may be used to store and/or transmit the software modules discussed herein.

Regarding the signals and information passed between blocks in FIG. 4, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

In the foregoing manner, a unique session id is maintained for each call among a plurality of NAS devices 28*a*-28*n*, and that unique session id is also maintained by the AAA server 30*a* and the off-load server 200 during call authentication, port counting, user authentication, and accounting, during the PPP session serviced by the off-load server 200.

ALTERNATIVE EMBODIMENTS

While particular embodiments of the present invention have been shown and described, it will be recognized to those skilled in the art that, based upon the teachings herein, further changes and modifications may be made without departing from this invention and its broader aspects.

For example, the off-load server 200 can be any device that provides PPP service or provides any other communication protocol service.

Also, for example, the unique appended identifier need not necessarily utilize the IP address as a unique identifier for each of a plurality of NAS devices 28*a*-28*n*. One skilled in the art will recognize that any identifier that distinguishes a NAS device from the other NAS devices can be appended to the beginning or end of the local session id in order to create a unique appended session id.

We claim:

1. A method comprising:

creating a unique session identifier for a user, wherein the unique session identifier is created by one of a plurality of network access servers; and the unique session identifier is created in a manner that prevents more than one of the network access servers from creating a same unique session identifier; and providing the unique session identifier from the one of the network access servers to an Authentication, Authorization, and Accounting (AAA) module; and providing the unique session identifier from the one of the network access servers to an additional server, wherein the additional server is also configured to provide the unique session identifier to the AAA module; and each of the network access servers is configured to request AAA processing from the AAA module.

2. The method recited in claim 1, wherein:
the creating the unique session identifier further comprises appending a unique identifier to a local session identifier, and
the unique identifier is associated with the one of the network access servers.

3. The method recited in claim 2, wherein:
the unique identifier is an IP address of the one of the network access servers.

4. The method recited in claim 1, further comprising:
providing the unique session identifier to an off-load server.

5. The method recited in claim 1, wherein:
the creating the unique session identifier further comprises creating a unique session identifier for each of the network access servers.

6. A system, comprising:
a network access server
wherein the network access server is configured to generate a unique session identifier for a user;
wherein the unique session identifier is created in a manner that prevents more than one of a plurality of network access servers from creating a same unique session identifier,
wherein the plurality of network access servers include the network access server;
wherein the network access server is configured to provide the unique session identifier to an AAA module; and
wherein the AAA module performs AAA processing for each of the plurality of network access servers.

7. The system recited in claim 6, wherein:
the network access server is associated with an IP address; and
the unique session identifier comprises the IP address.

8. The system recited in claim 6, further comprising:
the plurality of network access servers;
wherein each of the plurality of network access servers is configured to generate a corresponding unique session identifier.

9. The system recited in claim 6, further comprising:
an off-load server, the off-load server being coupled to receive the unique session identifier from the network access server.

10. The system recited in claim 9, wherein:
the off-load server is configured to provide the unique session identifier to the AAA module.

11. The system recited in claim 9, wherein:
the off-load server is configured to provide the unique session identifier to the AAA module, and
the AAA module is configured to perform port counting.

12. The system recited in claim 6, further comprising:
the AAA module, the AAA module being further configured to receive the unique session identifier from the network access server.

13. The system recited in claim 6, wherein:
the network access server is further configured to generate the unique session identifier by appending an IP address of the network access server to a local session identifier.

14. The system recited in claim 9, wherein:
the off-load server is further configured to generate a start record, the off-load server being further configured to associate the start record with the unique session identifier; and
the off-load server is further configured to provide the start record to the AAA module that provides for performing accounting processing.

15. The system recited in claim 9, further wherein:
the off-load server is further configured to generate a stop record, the off-load server being further configured to associate the stop record with the unique session identifier; and
the off-load server is further configured to provide the stop record to the AAA module that provides for performing accounting processing.

16. An apparatus, comprising:
means for creating a unique session identifier for a user, wherein
the unique session identifier is created in a manner that prevents more than one of a plurality of network access servers from creating a same unique session identifier; and
means for providing the unique session identifier to an AAA module, wherein
each of the network access servers is configured to request AAA processing from the AAA module.

17. The apparatus recited in claim 16, wherein:
means for creating a unique session identifier further comprises means for appending a unique identifier associated with a network access server to a local session identifier.

18. The apparatus recited in claim 17 wherein:
the unique identifier is an IP address.

19. The apparatus recited in claim 16, further comprising:
means for providing the unique session identifier to an off-load server.

20. The apparatus recited in claim 16, wherein:
the means for creating a unique session identifier further comprises means for creating a unique session identifier for each of the network access devices.

21. A computer program product, encoded in computer readable storage media, comprising:
a first set of instructions, executable on a computer system, configured to create a unique session identifier for a user, wherein
the unique session identifier is created in a manner that prevents more than one of a plurality of network access servers from creating a same unique session identifier; and
a second set of instructions, executable on a computer system, configured to provide the unique session identifier to an AAA module, wherein
each of the network access servers is configured to request AAA processing from the AAA module.

22. The computer program product of claim 21, encoded in computer readable storage media, wherein:
the first set of instructions, executable on a computer system, is further configured to append a unique identifier associated with one of the network access servers to a local session identifier.

23. The computer program product of claim 21, encoded in computer readable storage media, wherein:
the unique identifier is an IP address.

24. The computer program product of claim 21, encoded in computer readable storage media, further comprising:
a third set of instructions, executable on a computer system configured to provide the unique session identifier to an off-load server.

25. The computer program product of claim 21, encoded in computer readable storage media, wherein:
the first set of instructions, executable on a computer system, is further configured to create a unique session identifier for each of the network access servers.

* * * * *